J. F. JAMES.
HOSE COUPLING.
APPLICATION FILED OCT. 22, 1910.
1,098,265.
Patented May 26, 1914.
2 SHEETS—SHEET 1.
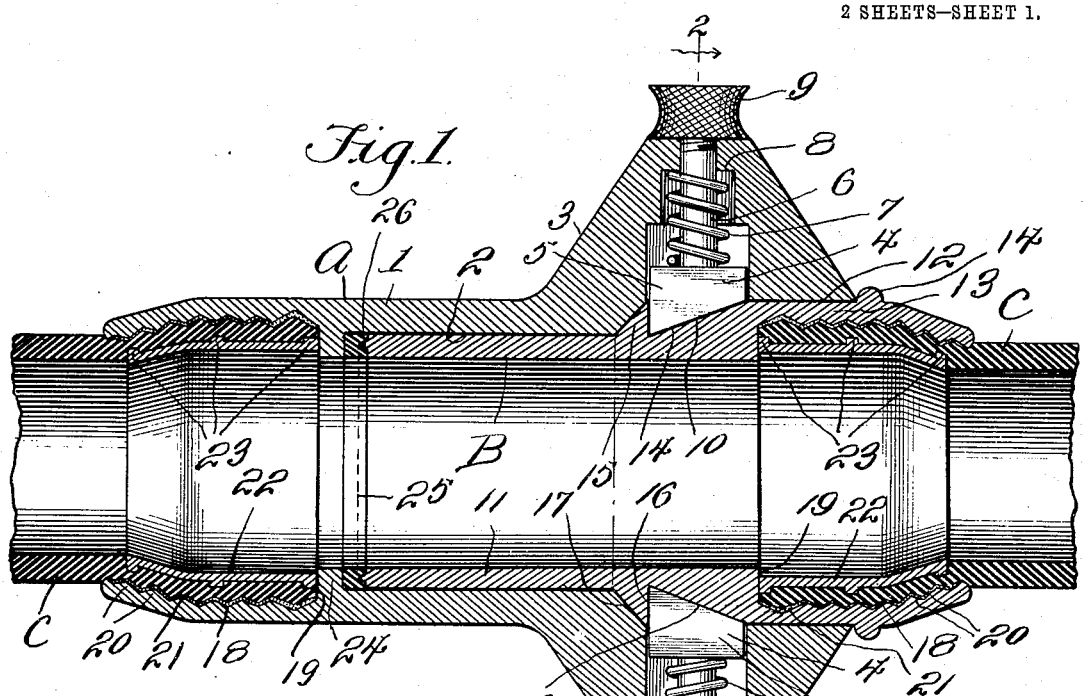
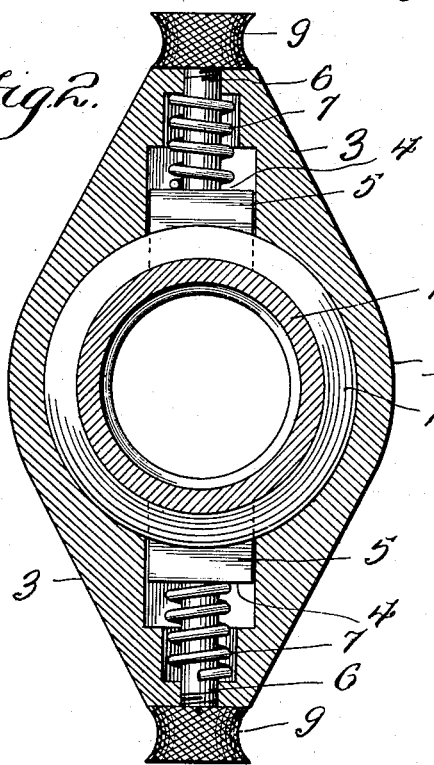
Witnesses
J. T. L. Wright
Inventor
Jesse F. James,
By Victor J. Evans,
Attorney

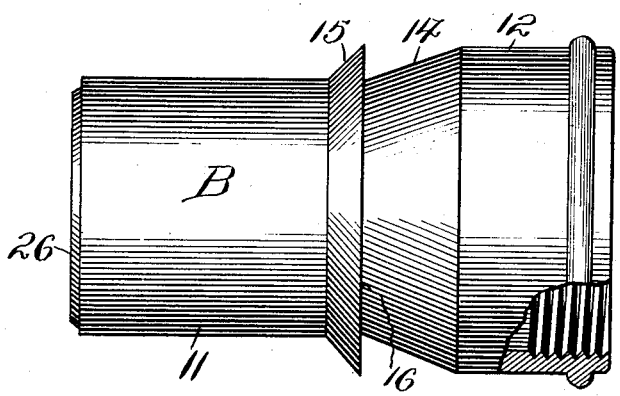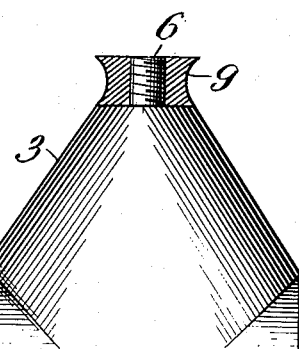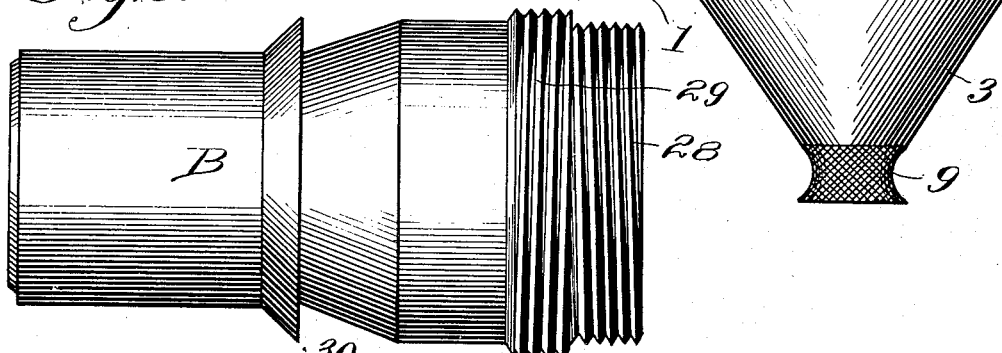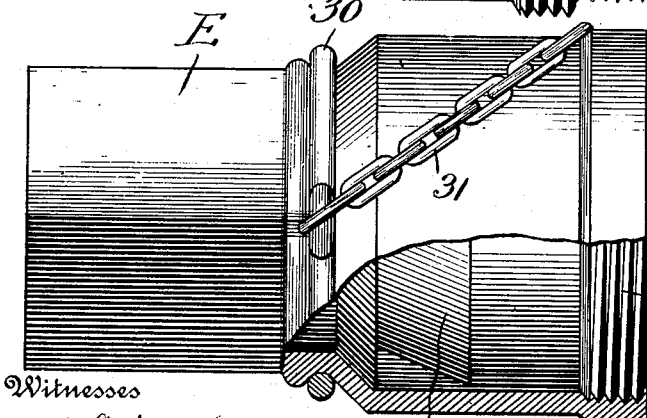

UNITED STATES PATENT OFFICE.

JESSE F. JAMES, OF BILLINGS, MONTANA.

HOSE-COUPLING.

1,098,265.   Specification of Letters Patent.   Patented May 26, 1914.

Application filed October 22, 1910. Serial No. 588,566.

*To all whom it may concern:*

Be it known that I, JESSE F. JAMES, a citizen of the United States, residing at Billings, in the county of Yellowstone and State of Montana, have invented new and useful Improvements in Hose-Couplings, of which the following is a specification.

This invention relates to hose couplings of that type in which one section fits in the other and the sections lock together by spring-pressed pawls on the outer section engaging behind an annular shoulder on the inner section.

The invention has for one of its objects to improve and simplify the construction and operation of devices of this character so as to be comparatively simple and inexpensive to manufacture, reliable and efficient in use and of such design that the sections of the coupling can be readily connected or disconnected.

Another object of the invention is the provision of an improved hose coupling having novel means for connecting the sections of the coupling to the hose.

With these objects in view, and others, as will appear as the description proceeds, the invention comprises the novel features of construction and arrangement of parts which will be more fully described hereinafter and set forth with particularity in the claim appended hereto.

In the accompanying drawing, which illustrates one embodiment of the invention, Figure 1 is a longitudinal section of the coupling. Fig. 2 is a transverse section on line 2—2 of Fig. 1. Fig. 3 is a perspective view of the expansible clamping ring or sleeve for connecting a coupling section to its hose. Fig. 4 is a plan view of the outer section of the coupling designed for use in connection with a nozzle. Fig. 5 is a plan view of the inner section designed for use in connection with a fire plug. Fig. 6 is a similar view with the cover applied, part of the cover being broken away. Fig. 7 is a plan view of the inner section of the coupling designed to be applied to a hydrant.

Similar reference characters are employed to designate corresponding parts throughout the several views.

Referring to the drawings, A designates the outer section of the coupling and B the inner section which is inserted longitudinally into the outer section. The outer section consists of a tubular body 1, which has a smoothly finished bore 2 for providing a comparatively snug fit with the inner section. On the outer sections are formed diametrically extending bosses 3, which are hollow and contain spring-pressed pawls or locking devices 4 for locking the sections of the coupling together. Each device 4 consists of a head 5 which extends into the bore of the outer section, and has an outwardly extending stem 6 around which is a helical compression spring 7, one end of the spring bearing against the head 5 and the other end bearing against a shoulder 8 in the boss 3. On the outer end of the stem is screwed a grip knob 9 which has its peripheral surface concaved so that the knob can be tightly gripped by the fingers in pulling the pawl outwardly when the sections of the coupling are to be disengaged. The inner surfaces 10 of the heads 5 are inclined to the axis of the coupling for facilitating the coupling of the sections.

The inner section B consists of a tubular body 11, which fits into the open end of the outer section, the bore of the latter being of greater diameter at 12 in front of the locking devices 4 than behind the latter, and the outer portion 13 of the inner section is enlarged to fit the portion 12 of the bore. At a point where the enlarged root portion 13 of the inner section merges into the smaller portion, there is provided an annular groove 14 that forms a shoulder 15 behind which the heads 5 of the locking devices engage. In other words, an annular flange 16 is formed around the inner section to provide means with which the locking devices are engaged, the said flange being beveled at 17 so that as the inner section is inserted, the flange will ride on the heads 5 of the locking devices and cause the latter to move outwardly against the tension of the springs 7 until the flange 16 passes beyond the said heads, at which time the locking devices spring inwardly and thus lock the sections together. Beveled portion 17 furthermore provides a bearing surface or shoulder for the correspondingly beveled portion 17' of the cutter section when the sections are coupled.

In order to securely fasten the hose C to each section of the coupling, the outer end of each has its bore enlarged at 18 to provide a shoulder 19 and the internal face of the portion 18 is provided with serrations 20, which form a better holding surface for cement 21 that binds the hose to the coupling section. The outer end of the coupling section is contracted to a diameter less than the external diameter of the hose so that it materially assists in preventing the hose from pulling loose. The hose extends into the coupling section as far as the shoulder 19 and then the hose has a ring or collar 22 of expansive metal, the said collar having peripheral ribs 23 for embedding in the hose. After the hose is inserted in the coupling section and the ring properly positioned, the said ring is expanded by a suitable tool so that it will spread the hose and clamp the same firmly in the coupling section, the said sleeve taking approximately the same form as the bore 18. To prevent leakage between the sections of the coupling, the outer section has an internal annular flange 24 between which and the inner end of the inner section is a packing ring 25. Obviously, if the coupling is to be used for connecting a nozzle to the hose, the outer end of one of the sections will be externally screw-threaded. In order to prevent leakage between the inner section B and the packing ring 25, the end of the inner section B has an annular ridge 26, Fig. 1, which embeds itself in the ring 25 and is held embedded by the locking devices 4.

When a hose nozzle is to be used in connection with the coupling, the outer section A has one end provided with external threads 27, Fig. 4, on which the nozzle will be screwed. When using the coupling in connection with a fire plug, the inner section B will be provided with external threads 28 to screw into the threaded opening of the plug, and the outer section on the end of the hose can be readily attached to the inner section B which will be always left on the fire plug. This inner section B will be protected by a cover E, Fig. 6, which is internally threaded to engage the threads 29 on the inner section B. This cover or cap is attached to the fire plug by a ring 30 and chain 31. For use in connection with an ordinary hydrant, the inner section of the coupling will be constructed as shown in Fig. 7, and may be provided with an internal thread to screw on the spout of the hydrant.

From the foregoing description, taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention, what I claim as new, is:—

A hose coupling comprising male and female sections, the latter being formed with oppositely disposed hollow bosses and having an enlarged end portion in advance of said bosses of greater diameter than any other portion of its length, said enlarged portion merging into the smaller portion to provide an annular inclined shoulder disposed medially of the length of said section and within and rearwardly of said bosses, said male section having an enlarged end portion snugly fitted in said enlarged portion of the female section, the enlarged portion of said latter section merging into the smaller portion thereof from a point in advance of said bosses and terminating at the rear thereof to provide an annular forwardly inclined groove disposed within said bosses and an annular flange disposed at one side thereof, said flange having a beveled outer surface adapted to engage said inclined shoulder when operatively associated with said female section, and spring pressed locking elements arranged in said bosses and adapted to engage the beveled surface of said flange on insertion of said male section to operative position to guide the locking elements in said grooves as described.

In testimony whereof I affix my signature in presence of two witnesses.

JESSE F. JAMES.

Witnesses:
W. A. FRINK,
G. C. CISEL.